US008841018B2

(12) United States Patent
Nakano et al.

(10) Patent No.: US 8,841,018 B2
(45) Date of Patent: Sep. 23, 2014

(54) BATTERY PACK

(71) Applicant: Sanyo Electric Co., Ltd., Moriguchi (JP)

(72) Inventors: Masaya Nakano, Sumuto (JP); Osamu Inaoka, Sumuto (JP); Takao Takatsu, Sumuto (JP); Haruhiko Yoneda, Sumuto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/681,760

(22) Filed: Nov. 20, 2012

(65) Prior Publication Data

US 2013/0136965 A1    May 30, 2013

(30) Foreign Application Priority Data

Nov. 25, 2011 (JP) ................................. 2011-257381

(51) Int. Cl.
*H01M 10/38* (2006.01)
*H01M 10/48* (2006.01)
*H01M 10/42* (2006.01)
*H01M 2/10* (2006.01)

(52) U.S. Cl.
CPC .......... *H01M 10/48* (2013.01); *H01M 10/4257* (2013.01); *Y02E 60/12* (2013.01); *H01M 2/105* (2013.01); *H01M 2/1077* (2013.01)
USPC ........... 429/123; 429/120; 429/121; 429/122; 429/160; 429/161; 429/170

(58) Field of Classification Search
CPC . H01M 10/4257; H01M 10/48; H01M 2/105; H01M 2/1077; Y02E 60/12
USPC ........................... 429/120–123, 160–161, 170
See application file for complete search history.

(56) References Cited

U.S. PATENT DOCUMENTS 5,929,600 A     7/1999  Hasegawa
6,262,887 B1 *  7/2001  Lee .......................... 361/679.27
(Continued)

FOREIGN PATENT DOCUMENTS

EP      2 317 585       5/2011
JP      2010-146879     7/2010

OTHER PUBLICATIONS

Extended European Search Report issued Mar. 8, 2013 in corresponding European patent application No. 12 19 3295.

*Primary Examiner* — Patrick Ryan
*Assistant Examiner* — Ben Lewis
(74) *Attorney, Agent, or Firm* — Wenderoth, Lind & Ponack, L.L.P.

(57) ABSTRACT

The purpose of the present invention is to provide simpler and more reliable electrical wiring than a lead wire. A battery pack includes at least one rechargeable secondary battery (1), a battery holder (70) for housing the secondary battery (1) in a predetermined position, a pack circuit board (74) having a mounted electronic circuit for monitoring the secondary battery (1), and an electrical connection wire (85) for electrically wiring the pack circuit board (74). Here, the electrical connection wire (85) is a bent metal wire. Because wiring is realized using metal wire, and the metal connection is secured after the wiring has been completed, movement and deformation due to vibrations and other factors, such as that which occurs in the case of conventional lead wires, are avoided, and reliability can be improved. Because the present invention has the simple configuration of a bent metal wire, manufacturing can be simplified, manufacturing costs can be reduced, and components requiring insulation to improve reliability can be reduced, thereby lowering material costs.

5 Claims, 23 Drawing Sheets

(56) References Cited

U.S. PATENT DOCUMENTS

| | | |
|---|---|---|
| 2009/0246615 A1 | 10/2009 | Park |
| 2010/0073005 A1* | 3/2010 | Yano et al. .................... 324/427 |
| 2010/0156350 A1 | 6/2010 | Murayama et al. |
| 2011/0097619 A1 | 4/2011 | Park |
| 2012/0045665 A1* | 2/2012 | Park .................................. 429/7 |

* cited by examiner

BATTERY PACK

FIELD OF THE INVENTION

The present invention relates to a battery pack detachably installed in a battery-powered device such as a power tool, an electric lawn mower, or an electric blower to supply electric power.

BACKGROUND

A battery-powered device such as a power tool can be used cordlessly, for example, at a construction site, when a detachable battery pack containing rechargeable batteries is provided. When the remaining capacity of a battery pack is low, the battery pack is placed in a battery pack charger and recharged.

FIG. 28 through FIG. 34 show an example of such a battery pack. FIG. 28 is an external perspective view of the battery pack, FIG. 29 is an exploded perspective view of the battery pack in FIG. 28, FIG. 30 is a perspective view of the battery holder 70X in FIG. 29, FIG. 31 is a perspective view of the battery holder in FIG. 30 with the pack circuit board 74X removed from the battery holder 70X, FIG. 32 is a vertical cross-sectional view of the battery holder 70X from line XXXII-XXXII in FIG. 30, FIG. 33 is an enlarged cross-sectional view of FIG. 32, and FIG. 34 is a perspective view of the power lead. The battery pack in these drawings contains a battery holder 70X in which a plurality of secondary batteries have been connected, and a pack circuit board 74X on which electronic circuitry for monitoring the batteries has been mounted. Lead wires and battery lead plates 80X are used to wire the pack circuit board 74X and the secondary batteries. The end faces of the secondary batteries are connected using battery lead plates 80X, and lead wires are used to connect the battery lead plates 80X to the pack circuit board 74X. A thick-diameter power lead 85X is used to wire a high-voltage output line.

However, the thick power lead 85X is wired in a tight space, and is not easy to solder. It is difficult to bend the power lead in the confined space as indicated by the solid arrows in FIG. 33 and FIG. 34. Even when the power lead 85X can be soldered, the power lead 85X can still move freely after being wired. For example, the lead wire sometimes moves in the direction indicated by the broken line arrow in FIG. 33. Therefore, when the battery pack is subjected to vibrations or impacts, the power lead 85X moves inside the battery pack. The lead wire may be worn down and exposed by friction, become disconnected, or come into contact with a component having a different voltage and short-circuit.

To resolve this problem, the wiring of the pack circuit board using metal lead plates has been considered. However, a large amount of space is required to arrange a circuit board using lead plates, and the conductivity is poor because thin plates are used. As battery packs get smaller, there will be increasing demand for reliable wiring in smaller wiring spaces. However, a wiring structure able to meet this demand has not yet been developed.

For an example, see Japanese Laid-open Patent Application No. 2010-146879.

SUMMARY

The present invention has been devised in view of the problem associated with the prior art. The main purpose of the present invention is to provide a battery pack with simpler and more reliable electrical wiring than a lead wire.

In order to achieve this purpose, a first aspect of the present invention is a battery pack includes at least one rechargeable secondary battery 1, a battery holder 70 for housing the secondary battery 1 in a predetermined position, a pack circuit board 74 having a mounted electronic circuit for monitoring the secondary battery 1, and an electrical connection wire 85 for electrically wiring the pack circuit board 74. Here, the electrical connection wire 85 is a bent metal wire. Because wiring is realized using metal wire, and the metal connection is secured after the wiring has been completed, movement and deformation due to vibrations and other factors, such as that which occurs in the case of conventional lead wires, are avoided, and reliability can be improved. Because the present invention has the simple configuration of a bent metal wire, manufacturing can be simplified, manufacturing costs can be reduced, and components requiring insulation to improve reliability can be reduced, thereby lowering material costs.

A second aspect of the present invention is a battery pack in which the electrical connection wire 85 is an output line of the secondary battery 1. In this way, a high-voltage output line can be used stably over a long time as a highly reliably electrical connection.

A third aspect of the present invention is a battery pack in which the electrical connection wire 85 has a bent portion 85a bent into a C-shape. In this way, the bent portion can be used to position the electrical connection properly. For example, twisting of the electrical connection can be prevented during wiring. Also, when the electrical connection is subjected to external shocks, deformation of the bent portion lessens the shock, and damage to the connection portion can be reduced.

A fourth aspect of the present invention is a battery pack in which the battery holder 70 has a plurality of holding ribs 78 for holding the bent portion 85a of the electrical connection wire 85 on the upper surface of the battery holder. In this way, the electrical connector with a bent portion can be positioned properly in both the length direction and the height direction.

DETAILED DESCRIPTION

Figure 1:
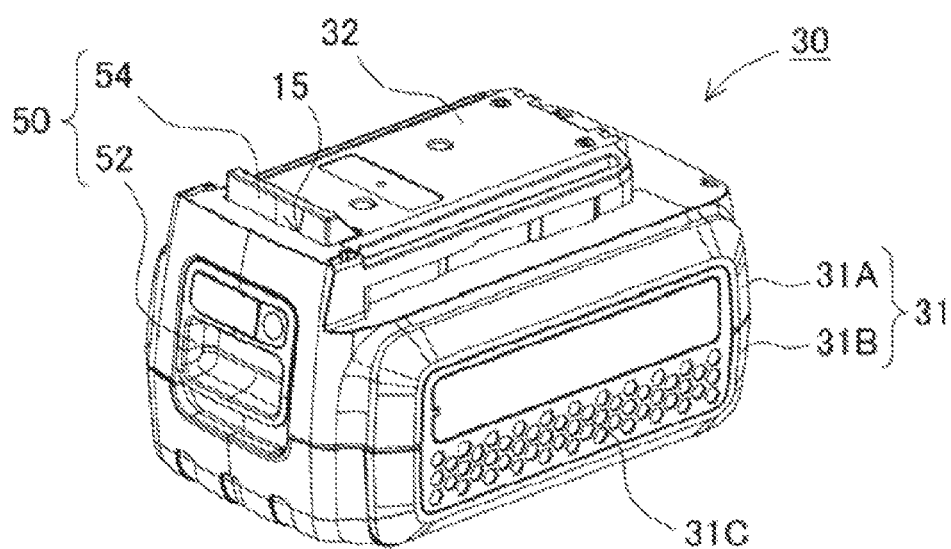
FIG. 1 is a perspective view showing a battery pack according to a first embodiment.

The following is an explanation of an embodiment of the present invention with reference to the drawings. The embodiment described below is used to illustrate a battery pack realizing the technical concepts of the present invention. The present invention is not specific to the battery pack described below. Also, the components described in the claims are not specific to the components in the embodiment. The dimensions, materials, shapes and relative arrangement of the configurational elements described in the embodiments, unless otherwise indicated, do not limit the scope of the present invention and server merely as an explanatory example. The sizes and relative positions of the components shown in the drawings may be exaggerated for illustrative purposes. In the following explanation, identical or similar components are indicated by the same name and are denoted by the same reference number. A detailed explanation is omitted where appropriate. A plurality of elements constituting the present invention may be combined into a single element, or a plurality of elements may work together as a single element. Conversely, the function of a single element may be divided and realized using a plurality of elements. Also, details described in one embodiment or example may be applied to another embodiment or example.

Example 1

Figure 2:
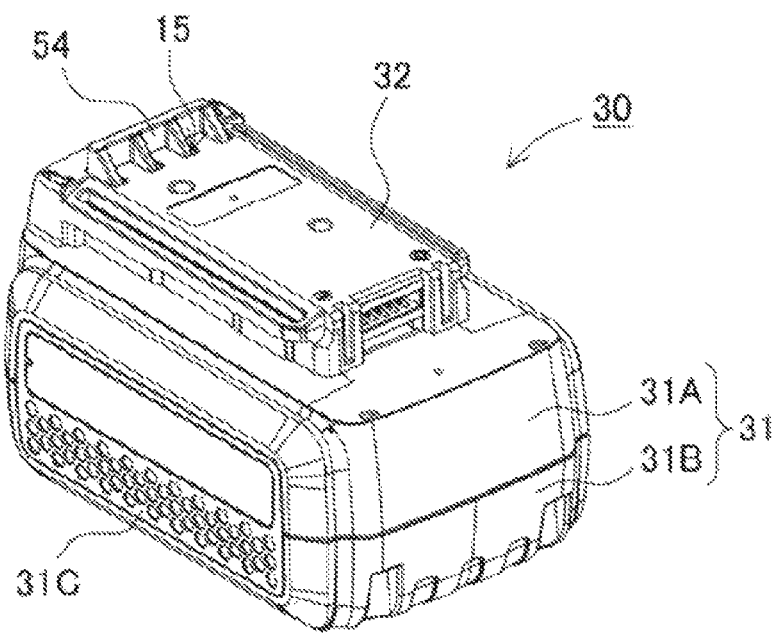
FIG. 2 is a perspective view showing a rear view of the battery pack in FIG. 1.
Figure 3:
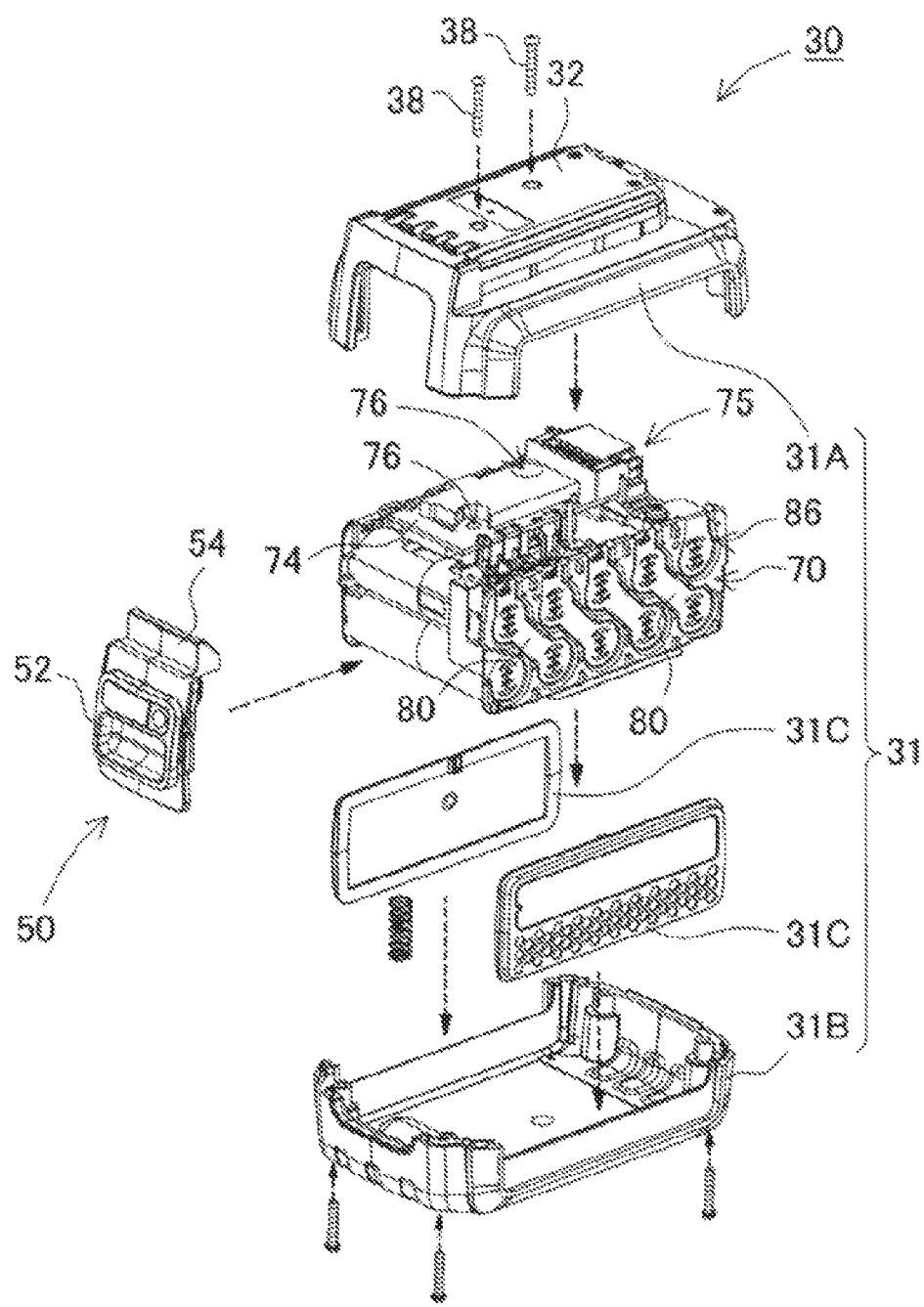
FIG. 3 is an exploded perspective view of the battery pack from the position in FIG. 1.
Figure 4:
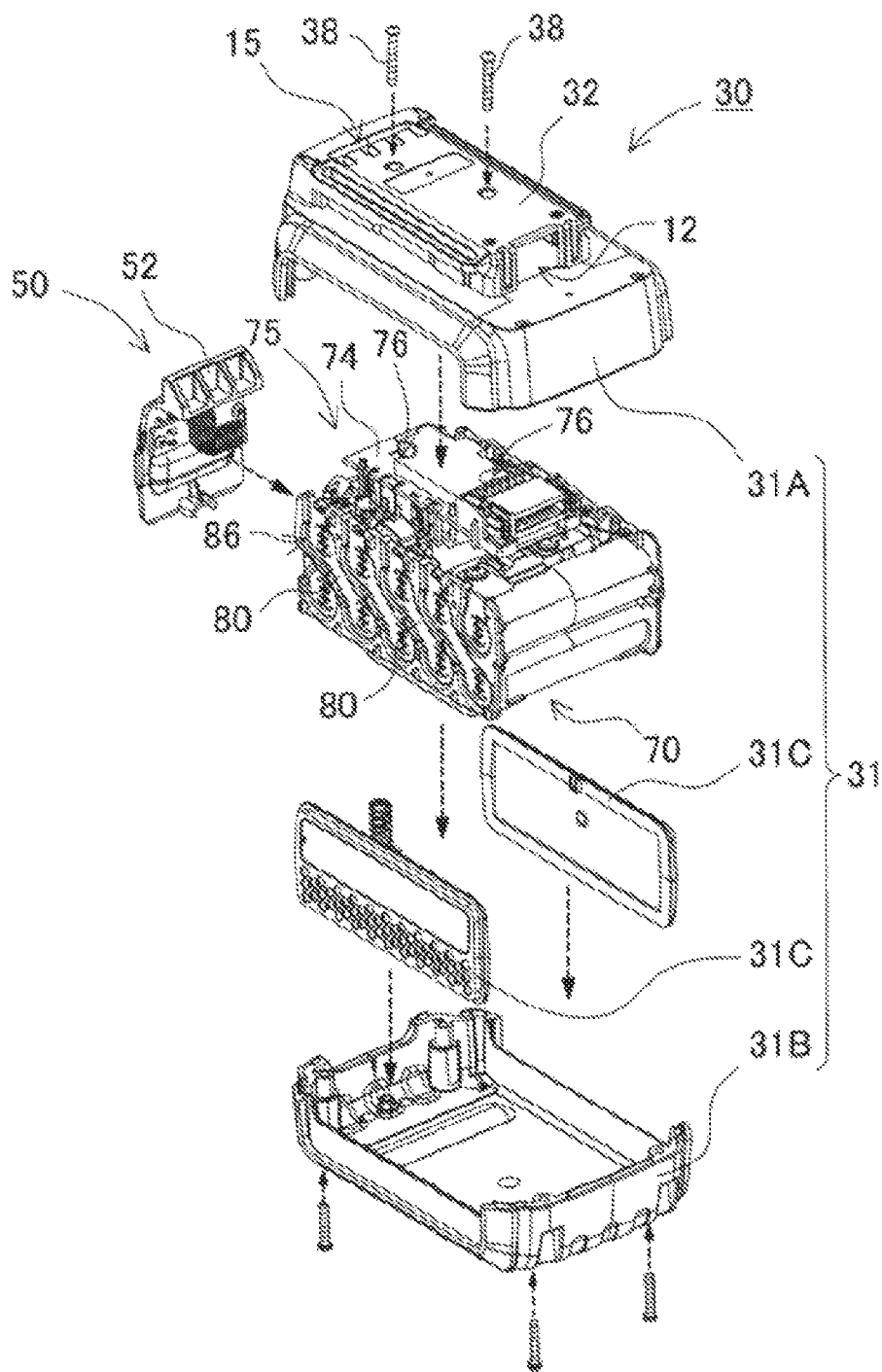
FIG. 4 is an exploded perspective view of the battery pack from the position in FIG. 2.

FIG. 1 through FIG. 4 show a battery pack for a power tool which is the battery pack in the first embodiment of the present invention. FIG. 1 is a perspective view showing a battery pack 30, FIG. 2 is a perspective view showing a rear view of the battery pack 30 in FIG. 1, FIG. 3 is an exploded perspective view of the battery pack 30 from the position in FIG. 1, and FIG. 4 is an exploded perspective view of the battery pack 30 from the position in FIG. 2. The following is an explanation of a battery pack for a power tool. However, the battery pack of the present invention is not limited to battery packs for power tools. The present invention can be adapted for use in any other type of battery-powered device.

The battery pack 30 in these drawings has a box-like profile and contains secondary batteries 1. More specifically, the battery pack 30 includes a battery holder 70 for housing a plurality of rechargeable secondary batteries 1, battery lead plates 80 connected to the secondary batteries 1 on their end faces, a pack circuit board 74 on which a protection circuit for the secondary batteries 1 has been mounted, a plurality of external connection terminals 33 connected to the battery-operated device or battery pack charger, and a battery case 31 housing the battery holder 70 and the pack circuit board 74.

(Battery Case 31)

As shown in FIG. 1 and FIG. 2, the battery case 31 has a box-like profile with rounded corners. The external connection terminals 33 protrude from the surface to connect the case to the connection terminals of a battery-operated device or battery pack charger. The battery pack 30 has a latching unit 50 for securing the pack when it has been attached to a battery-operated device or battery pack charger. The battery case 31 is molded from a resin with superior insulating properties and strength.

As shown in the exploded perspective views of FIG. 3 through FIG. 4, the battery case 31 is divided in half into an upper casing 31A and a lower casing 31B. A storage space is configured inside the battery case 31 for housing the battery holder 70, the pack circuit board 74, and the latching unit 50. The sides of the battery case 31 are covered by side covers 31C. The side covers 31C are combined as separate components with the upper casing 31A and the lower casing 31B. The edges of the side covers 31C are inserted into grooves provided in the upper casing 31A and the lower casing 31B, and are interposed between and secured by the upper casing 31A and the lower casing 31B.

(Battery Holder 70)

Figure 5:
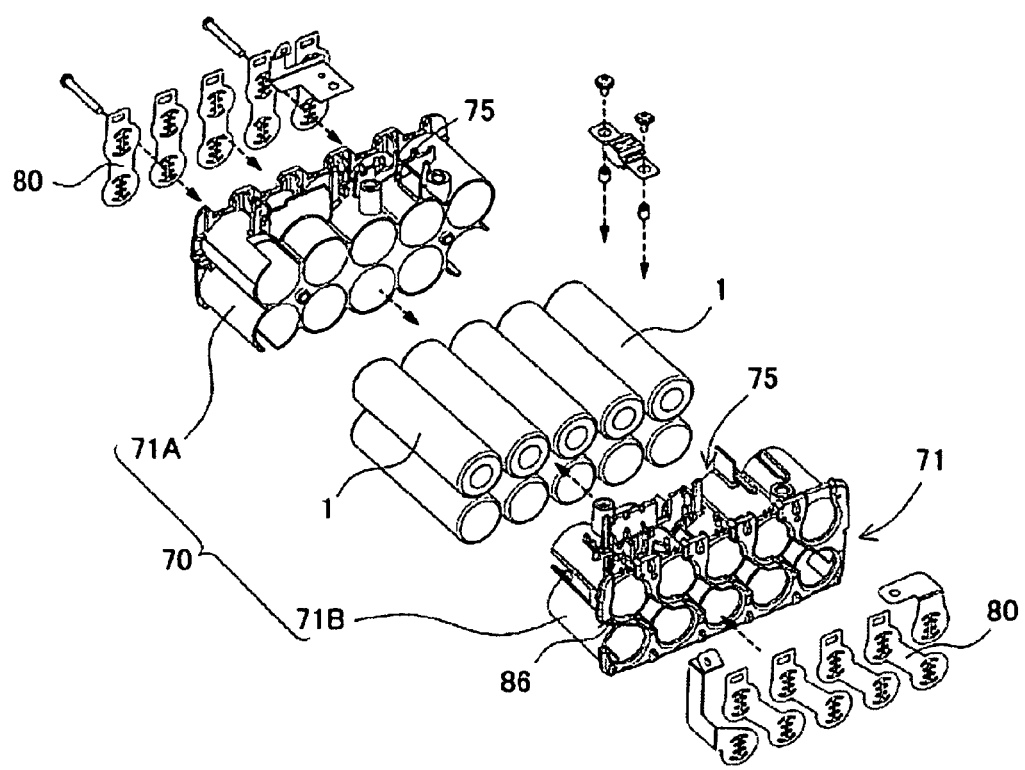
FIG. 5 is an exploded perspective view of the battery holder.

As shown in FIG. 3 through FIG. 5, the battery holder 70 includes secondary batteries 1, a pack circuit board 74, battery lead plates 80, and different types of lead wires. The battery holder 70 is also provided with a battery storage space for storing secondary batteries 1 on the lower surface, and a circuit board securing portion 75 for securing the pack circuit board 74 on the upper surface. The secondary batteries 1 are connected to the battery lead plates 80 on the end faces of the secondary batteries 1 exposed by the exposed portion 71 in the end face of the battery holder 70, and the output of the battery core storing the secondary batteries 1 in the battery holder 70 is connected to the pack circuit board 74 via an output lead plate and an output lead wire. The battery lead plates 80 are also connected to the pack circuit board 74 via a signal lead wire 84.

(External Connection Terminals 33)

Figure 6:
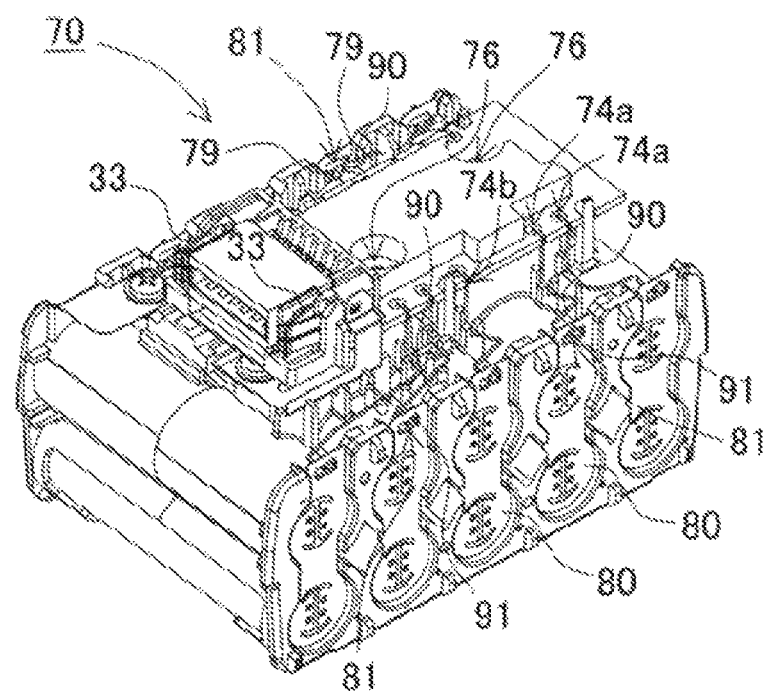
FIG. 6 is a perspective view of the battery holder.
Figure 9:
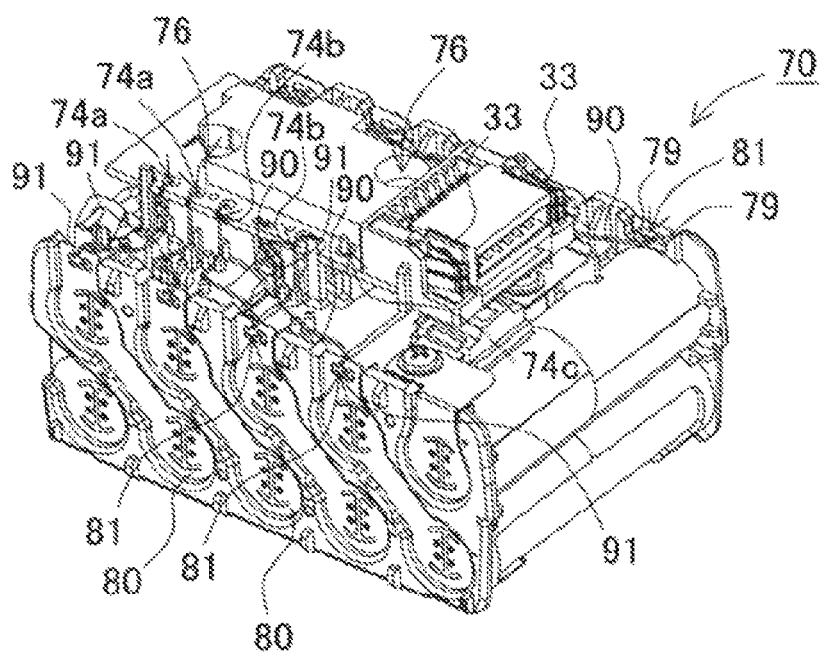
FIG. 9 is a perspective view of the battery holder in FIG. 6 from the left side.

The battery pack 30 has a plurality of external connection terminals 33 connected to a battery-operated device or battery pack charger. The external connection terminals 33 are secured to the pack circuit board 74. In addition to the outputs from the secondary batteries 1, signal terminals can be provided for exchanging signals with an externally connected battery pack charger or battery-operated device. These external connection terminals 33 are bent metal plates. As shown in FIG. 6 and FIG. 9, each external connection terminal 33 has a rear end bent into a C-shape when viewed from above. The open end of the C-shape is bent in a tapered fashion so as to become gradually narrower at the tip connected electrically to a connection terminal on an externally connected device such as a battery pack charger or battery-operated device. The connection terminal on the externally connected device is inserted between the two bent metal plates, and is interposed between the two metal plates to establish an electrical connection.

(Latching Unit 50)

As shown in FIG. 1 through FIG. 4, the latching unit 50 provided on the battery pack 30 is movably housed inside the battery case 31 and partially exposed inside the battery case 31. The latching unit 50 has a detachment unit 52 on the front surface which is operated manually by the user, and an engaging hook 54 in the upper portion in the drawing which has both an inclined surface inclined in the forward direction when attached to the battery pack 30, and a perpendicular surface formed continuously with the perpendicular surface. The engaging hook 54 is integrally molded with the detachment unit 52. A hook protrusion window 15 is formed in the upper case 31A from which the engaging hook 54 on the latching unit 50 protrudes. A holding recess 17 is formed in the detachment unit 52 in a position corresponding to the engaging hook 54. This holding recess 17 also has a recessed inclined surface aligned with the inclined surface of the hook, and a recessed perpendicular surface aligned with the horizontal surface of the hook.

(Protection Circuit)

A protective circuit for the secondary batteries 1 is mounted on the pack circuit board 74. The protective circuit is connected via battery lead plates 80 and a signal lead wire to detect the voltage of each secondary battery 1. The external connection terminals 33 of the pack circuit board 74 include charge/discharge terminals, and signal terminals for outputting signals from the protective circuit and battery information. As shown in FIG. 2, these charge/discharge terminals and signal terminals are exposed on the surface of the battery case 31.

(Secondary Batteries 1)

The battery case 31 is molded into a shape able to store secondary batteries 1. Here, the secondary batteries 1 are cylindrical storage batteries in which the cylindrical outer canister is arranged in the longitudinal direction. As shown in FIG. 4, the battery case 31 includes a plurality of secondary batteries 1 arranged side-by-side on the same plane so as to be parallel to each other inside the battery case 31. The secondary batteries 1 housed inside the battery pack 30 are lithium-ion batteries. However, the secondary batteries can be any other type of rechargeable battery, including nickel-metal hydride batteries, nickel-cadmium batteries, and polymer batteries. The secondary batteries can be connected in series to increase the output voltage, or connected in parallel to increase the output current. In this example, the secondary batteries 1 are lithium-ion batteries, five pairs of batteries arranged in parallel are connected in series, and the output voltage is 18 V. However, there are no restrictions on the number of secondary batteries or their connection arrangement. The battery pack can be designed freely based on the type of battery-operated device being used, the intended use of the battery-operated device, and the number of secondary batteries and the output voltage being used.

(Battery Storage Space)

As shown in the exploded perspective view of FIG. 5, the battery storage space of the battery holder 70 is divided in half into a first subholder 71A and a second subholder 71B, and the secondary batteries 1 are interposed between the first subholder 71A and the second subholder 71B. In this example, the battery holder holds ten secondary batteries 1. In the battery holder 70, the secondary batteries 1 housed inside the battery storage space are connected by their end surfaces exposed in the exposed portion 71 to the battery lead plates 80.

(Battery Lead Plate 80)

As shown in the exploded perspective view of FIG. 5, the battery lead plates 80 are flat metal plates with superior conductive properties that are formed into a size that can be housed inside the battery storage space. Welding slits are formed in the battery lead plates 80 for spot welding, and are secured to the end surface of adjacent secondary batteries 1 housed inside the battery storage space.

(Circuit Board Securing Portion 75)

Figure 7:
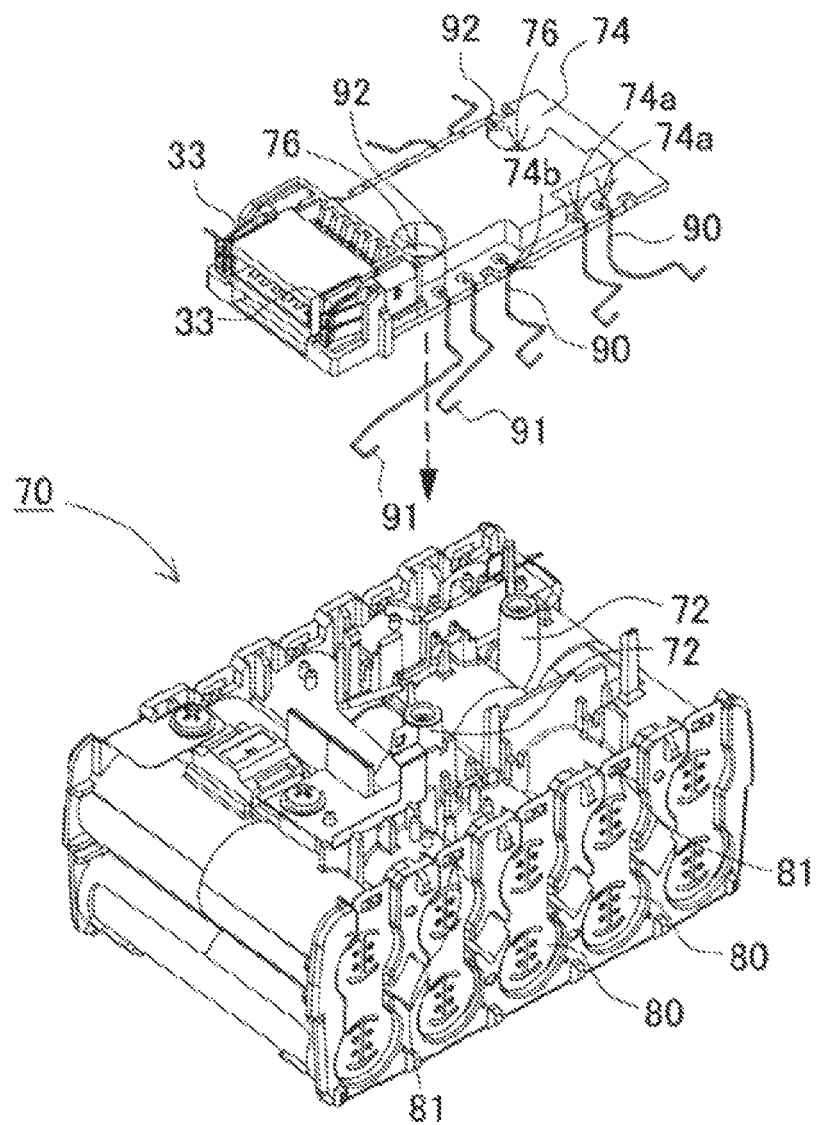
FIG. 7 is a perspective view of the battery holder in FIG. 6 with the pack circuit board removed.

A circuit board securing portion 75 is provided in the upper surface of the battery holder 70 to secure the pack circuit board 74. FIG. 6 and FIG. 7 show a pack circuit board 74 mounted in the circuit board securing portion 75. FIG. 6 is a perspective view of the battery holder 70, and FIG. 7 is a perspective view of the battery holder 70 in FIG. 6 with the pack circuit board 74 removed. The battery holder 70 shown in these drawings has bosses 72 for supporting the pack circuit board 74. Boss holes 76 are provided in the pack circuit board 74 in positions corresponding to the bosses 72. The tip of a boss 72 is inserted into the boss hole 76 from the underside of the pack circuit board 74, and secured using a screw or some other means. While not shown in the drawings, this example has a column protruding towards the pack circuit board 74 on the inner surface of the upper casing 31A in each position corresponding to a boss 72. Each column has an insertion pin on the tip. The insertion pin of each column is passed through a threaded hole in which a screw is inserted, and connected to a threaded hole 37 formed in the upper surface of the upper casing 31A. As shown in FIG. 3 and FIG. 4, a screw 38 can be screwed into the threaded hole 37 from the upper casing 31A to secure the pack circuit board 74 to the upper casing 31A.

(Electrical Connection Wire 85)

Figure 8:
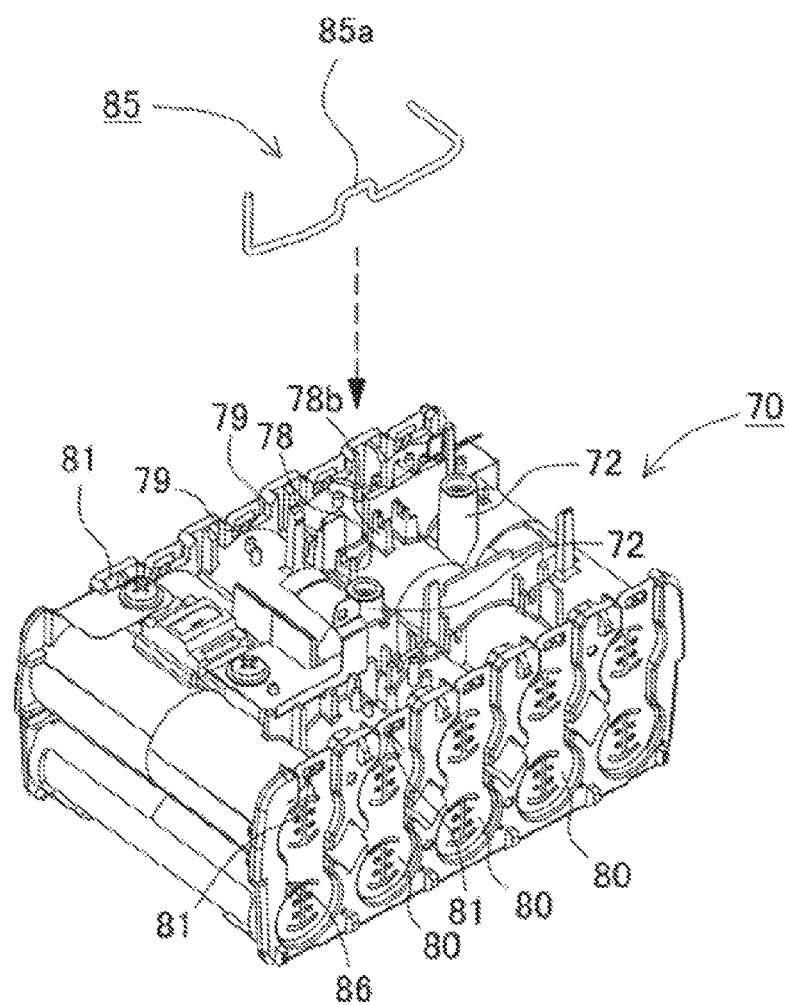
FIG. 8 is a perspective view of the battery holder in FIG. 7 with the electrical connection wires removed.
Figure 10:
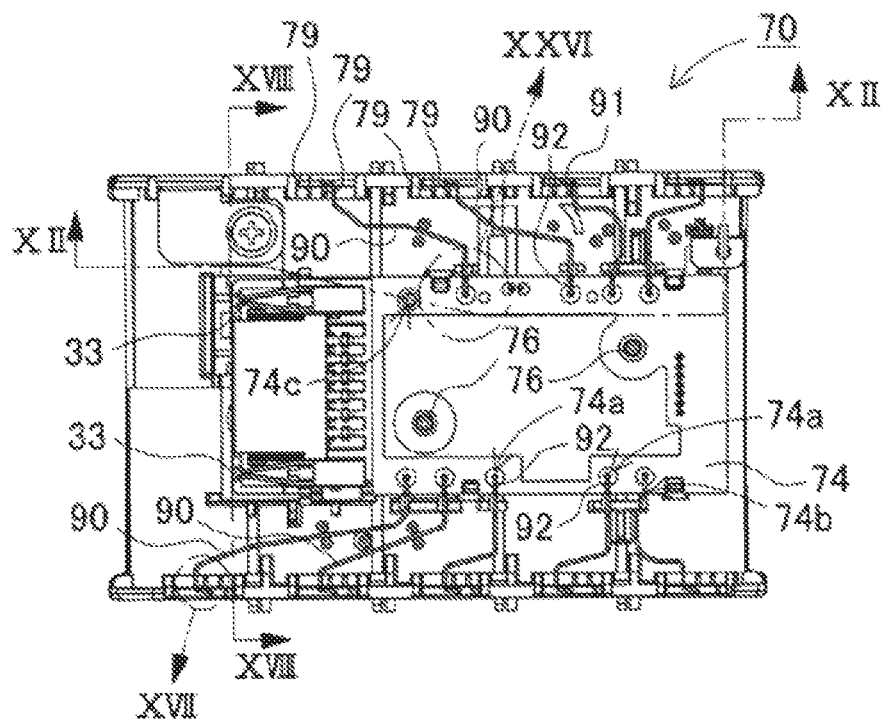
FIG. 10 is a top view of the battery holder in FIG. 9.
Figure 11:
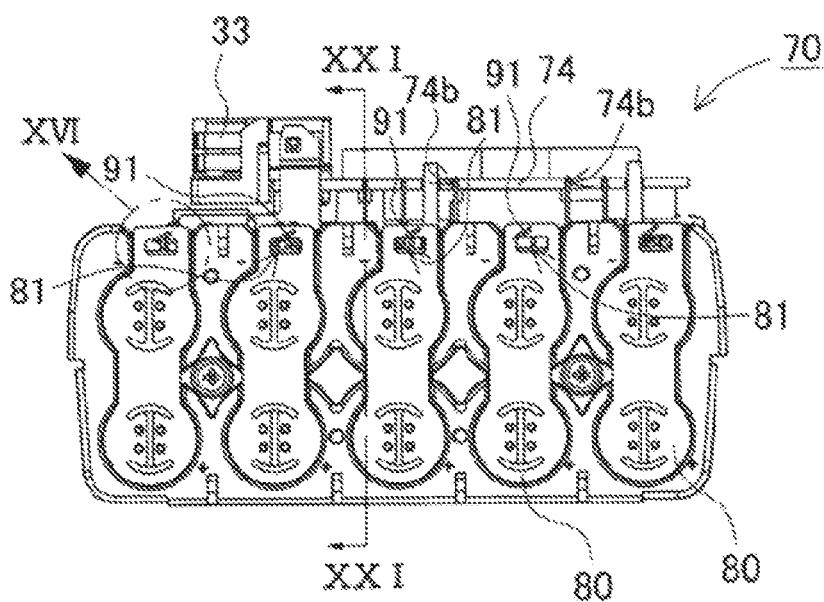
FIG. 11 is a side view of the battery holder in FIG. 10.
Figure 12:
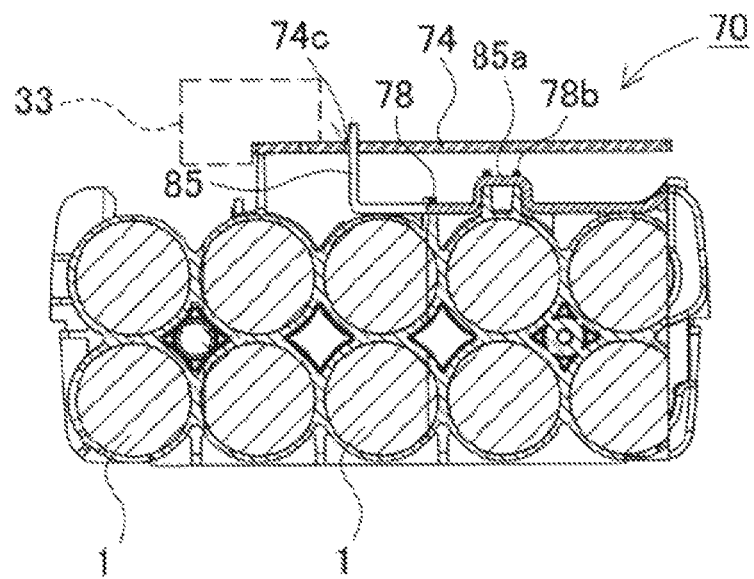
FIG. 12 is a vertical cross-sectional view of the battery holder from line XII-XII in FIG. 10.
Figure 13:
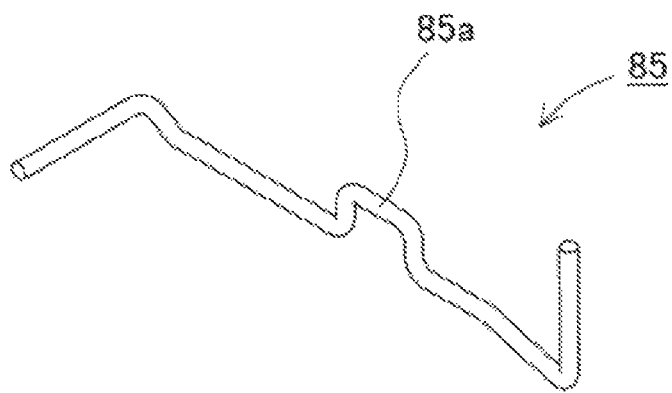
FIG. 13 is an external perspective view of an electrical connection wire.

This pack circuit board 74 uses electrical connection wires 85 instead of power lead wires to connect the outputs from the secondary batteries 1 housed inside the battery holder 70. This arrangement is shown in FIG. 8 through FIG. 13. FIG. 8 is a perspective view of the battery holder 70 in FIG. 7 with the electrical connection wires 85 removed. FIG. 9 is a perspective view of the battery holder 70 in FIG. 6 from the left side. FIG. 10 is a top view of the battery holder 70 in FIG. 9. FIG. 11 is a side view of the battery holder 70 in FIG. 10. FIG. 12 is a vertical cross-section sectional view of the battery holder 70 from line XII-XII in FIG. 10. FIG. 13 is an external perspective view of an electrical connection wire 85. The electrical connection wires 85 in these drawings are bent metal wires. Both ends of the metal electrical connection wires 85 are bent as shown in FIG. 13. As shown in FIG. 9, one end is inserted into the pack circuit board 74, the other end is inserted into a battery lead plate 80, and both ends are soldered in place. Both ends can be bent in different directions as shown in FIG. 13, and can flexibly conform to the connection route. A connection hole 74c is formed in the pack circuit board 74 for inserting an end of an electrical connection wire 85. The end of the electrical connection wire 85 is inserted into the connection hole 74c, and secured to the pack circuit board 74 using soldering or some other means.

The metal connection wires 85 can be made of a metal with superior electrical conductivity such as nickel, tin or copper. The wire can be round or flat like a lead plate, and suppress both resistivity and joule heat. The metal connection wires do not run along the surface of the pack circuit board 74 like a lead wire or lead plate. Instead, both ends are bent so that the wire floats above the surface of the pack circuit board 74. Because there is space between the wire and the surface of the pack circuit board 74, this arrangement is advantageous from the standpoint of insulating properties and heat dissipating properties. Because the wire is not flexible like a lead wire, it does not move on account of mechanical vibrations or impacts. It also does not wear down due to fiction and disconnect. Because the metal connection wire is a simple bent metal wire, manufacturing costs are kept down, and the metal connection wires are easy to machine. Use of bent metal electrical connection wires 85 in this way is superior to conventional lead wires and lead plates from the standpoint of reliability, workability, and machinability.

(Holding Ribs 78)

As shown in the exploded perspective view of FIG. 8, the electrical connection wires 85 are secured to the upper surface of the battery holder 70. As shown in the exploded perspective view of FIG. 7, they are also secured to the pack circuit board 74. A plurality of holding ribs 78 are formed in the upper surface of the battery holder 70 to hold the electrical connection wires 85.

(Bent Portion 85a)

As shown in the perspective view of FIG. 13, the electrical connection wire 85 can be formed with a C-shaped (U-shaped) bent portion 85a in the middle. As shown in the exploded perspective view of FIG. 8, this bent portion can be held in a predetermined position by holding ribs 78 of different heights. In other words, among the holding ribs 78 provided on the upper surface of the battery holder 70, the height of the pair of middle holding ribs 78b for holding the bent portion 85a can be increased in response to the depth of the bent portion 85a. As a result, positioning of the electrical connection wire 85 is achieved which would be inherently easy to rotate when linear, and the ends can be inserted properly into the pack circuit board 74 and the battery lead plate 80. In particular, when the end of an electrical connection wire 85 is inserted into a connection hole 74c in the pack circuit board 74 during assembly, turning of the metal wire is prevented by the middle holding ribs 78b. Also, the electrical connection wire 85 can be positioned longitudinally by holding both ends of the C-shaped bent portion 85a using a pair of middle holding ribs 78b. By guiding the electrical connection wire 85 using a plurality of holding ribs, the deformation of the electrical connection wire 85 can also be lessened when subjected to the force of an external impact.

The bent portion 85a is preferably positioned near the center of the electrical connection wire 85. In this way, stable positioning can be achieved. When subjected to a strong external impact, a hard metal wire is more likely to transmit the impact than a flexible lead wire, so there is a possibility that the impact force will be transmitted to a connection and cause damage. By providing a bent portion 85a, the impact force can be absorbed by the deformed bent portion 85a. This can be expected to reduce the risk of damage to the connection.

In this example, the electrical connection wire 85 is an output line from a secondary battery. However, the present invention is not restricted to this example. The bent metal electrical connection wire 85 can also be a signal wire.

(Measuring Midpoint Potential)

In order to determine the status of each secondary battery 1 in a battery pack 30 in which a plurality of secondary batteries 1 have been connected, the midpoint potential is measured. When the secondary batteries 1 are lithium-ion batteries, the cell voltage of each secondary battery is measured. In this configuration, the voltage is measured at each battery lead plate 80 connected to secondary batteries, and the voltage value is transmitted to the pack circuit board 74. More specifically, the pack circuit board 74 secured to the upper surface of the battery holder 70 is connected electrically to the battery lead plates 80, and the protection circuit mounted on the pack circuit board 74 monitors the voltage status. Also, the battery lead plates 80 are secured to the secondary batteries 1 on the side surfaces of the battery holder 70, and the status of the secondary batteries 1 is monitored by the pack circuit board 74. A lead plate securing frame 86 is provided on the side surface of the battery lead plates 80 to secure each battery lead plate 80.

(Lead Pin 90)

Figure 14:
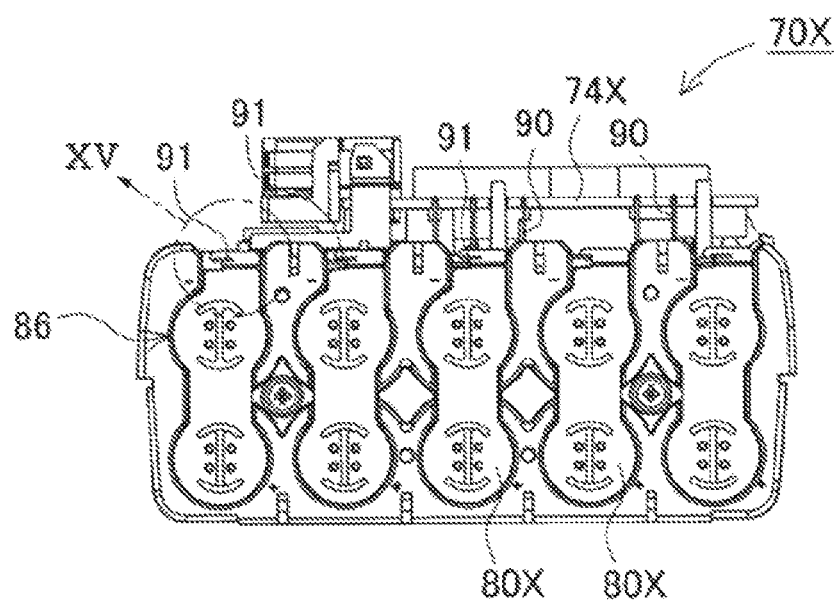
FIG. 14 is a side view of a battery holder of the prior art.
Figure 15:
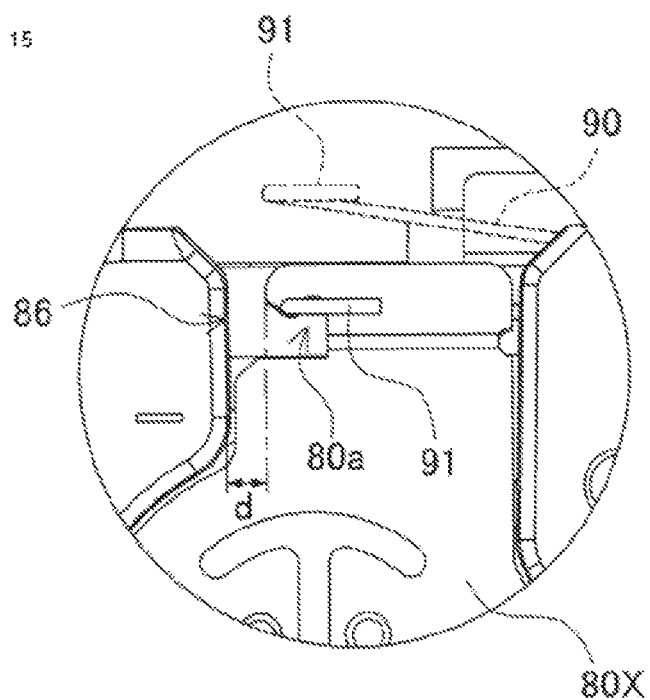
FIG. 15 is an enlarged view of the main portion of the battery holder in FIG. 14.

The pack circuit board and the battery lead plates are connected via lead pins. This arrangement will now be explained with reference to the side view of the battery holder 70X shown in FIG. 14 and the enlarged view in FIG. 15 of the portion surrounded by the dotted lines in FIG. 14. As shown in the drawings, the lead pin 90 is a bent thin metal wire. The lead pin 90 is inserted into a pin securing hole 74a in the pack circuit board 74 and secured. The other end of the lead pin 90 engages a battery lead plate 80X and is secured. The other end of the lead pin 90 is the engaging end 91 which is bent as shown in the enlarged view of FIG. 15. A slit 80a is provided in the battery lead plate 80X to engage the engaging end 91 of the lead pin 90. The slit 80a is formed in the far end of the battery lead plate 80X as viewed from the pack circuit board 74. When the other end of the lead pin 90 is engaged in the slit 80a in this manner, the lead pin 90 has been secured and will not come out. If necessary, the lead pin 90 and the battery lead plate 80X can be secured using soldering.

In this configuration, the tip of the lead pin 90 has to be manually inserted into the slit in the battery lead plate 80X by the operator. In order to guide the operator in cutting the other end of the lead pin 90 in the slit, the lead pin 90 is pulled once and pushed into the slit. It is then turned up in the opposite direction to secure the pin. In order to realize this engaging operation, as shown in the enlarged view of FIG. 15, the space indicated by d has to be provided between the edge of the battery lead plate 80X including the slit and the lead plate securing frame 86 in the battery holder 70X. This space is only required during assembly of the battery pack, and remains after assembly. However, narrowing the width of the upper portion of the battery lead plate 80X to eliminate this inefficient use of space increases processing costs because of the need for a slit with a more complicated shape in the battery lead plate 80X. It also reduces the strength of the portion in which the lead pin 90 is secured to the battery lead plate 80X.

(Lead Opening 81)

Figure 16:
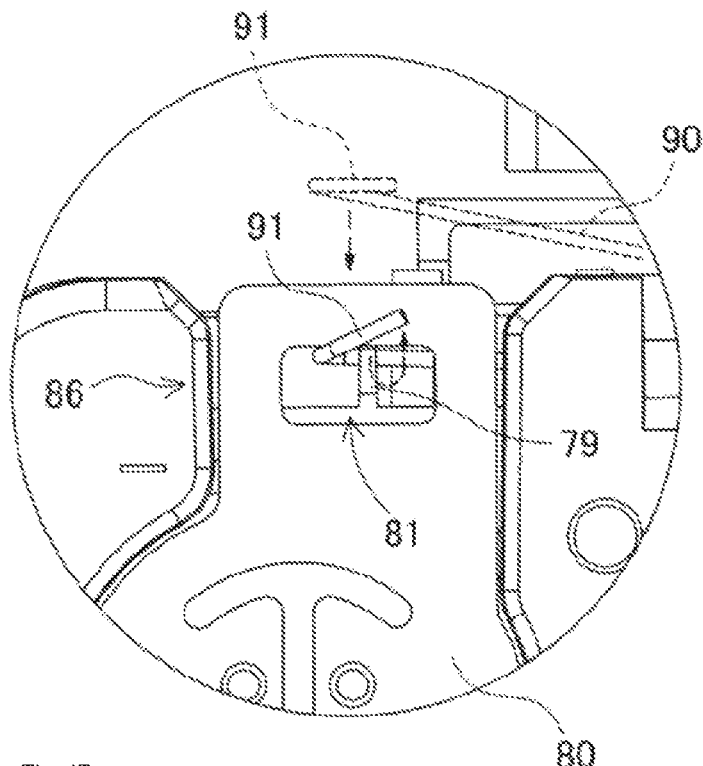
FIG. 16 is an enlarged view of portion XVI of the battery holder in FIG. 11.

By contrast, in battery pack 30 of the present embodiment, as shown in FIG. 11 and FIG. 16, a lead opening 81 is formed in the upper end of the battery lead plate 80 for inserting the engaging end 91 of the lead pin 90. This lead opening 81 is closed off. In other words, because the lead opening 81 does not have a slit leading to the edge of the battery lead plate 80, the strength of the battery lead plate 80 is increased. Also, as is clear in a comparison of FIG. 15 and FIG. 16, there is no guiding slit as in a battery lead plate 80 of the prior art. As a result, the upper end of the battery lead plate 80 can be increased by an equivalent amount. This increases the mechanical strength of the battery lead plate 80, and the width of the lead opening can be extended in the length direction of the lead pin 90. In other words, the width of the lead opening 81 can be increased. This makes the lead engaging end 91 easier to insert into the lead opening 81, and contributes to improved workability during assembly. In addition, a complicated slit is not required. A hole is simply created in the battery lead plate 80 to serve as the lead opening 81. Thus, the manufacturing and processing costs for electrode lead plates can be reduced.

The other end of the lead pin 90 is secured to a pin securing hole 74a formed beforehand in the pack circuit board 74. As shown in the top view of FIG. 10, the lead engaging end 91 of the lead pin 90 is arranged so that it protrudes towards the lead opening 81. The length of the lead pin 90 from the pin securing hole 74a to the lead engaging end 91 is designed to be roughly equal to the distance from the pin securing hole 74a to the battery lead plate 80. When the lead engaging end 91 is inserted into the lead opening 81 in this way, the lead engaging end 91 is pushed from above the battery lead plate 80 as indicated by the dotted lines in FIG. 16 using the pin securing hole 74a as the pivot point. This elastically deforms the lead engaging end 91 which then protrudes from the lead opening 81. This operation is not complicated as in FIG. 15 where the lead engaging end 91 is elongated and pushed back into a slit. In this simple operation, the lead engaging end 91 is simply pushed down, and the lead engaging end 91 inserts itself into the lead opening 81. This greatly improves workability. Because the length of the lead engaging end 91 is less than the width of the lead opening 81, the lead engaging end 91 can be elastically and easily pushed into the lead opening 81.

(Guiding Rib 79)

Figure 17:
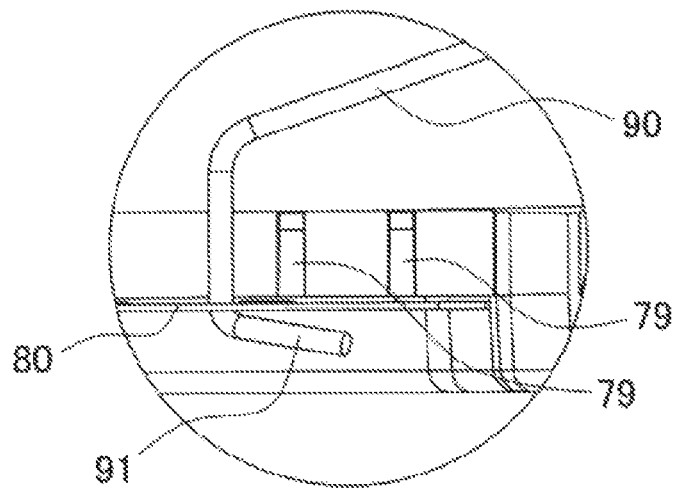
FIG. 17 is an enlarged view of portion XVII of the battery holder in FIG. 10 in which a lead pin has been inserted into a lead hole in the battery lead plate.
Figure 18:
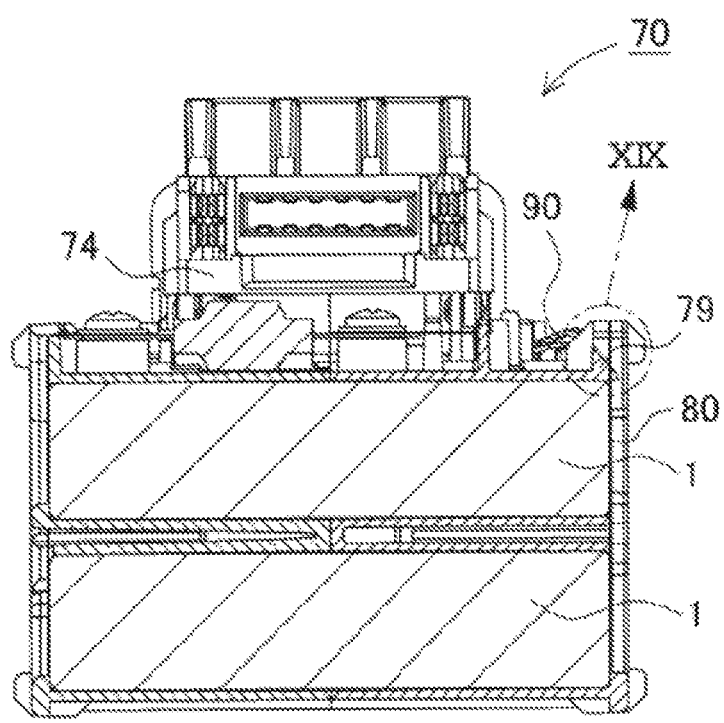
FIG. 18 is a vertical cross-sectional view of the battery holder from line XVIII-XVIII in FIG. 10.
Figure 19:
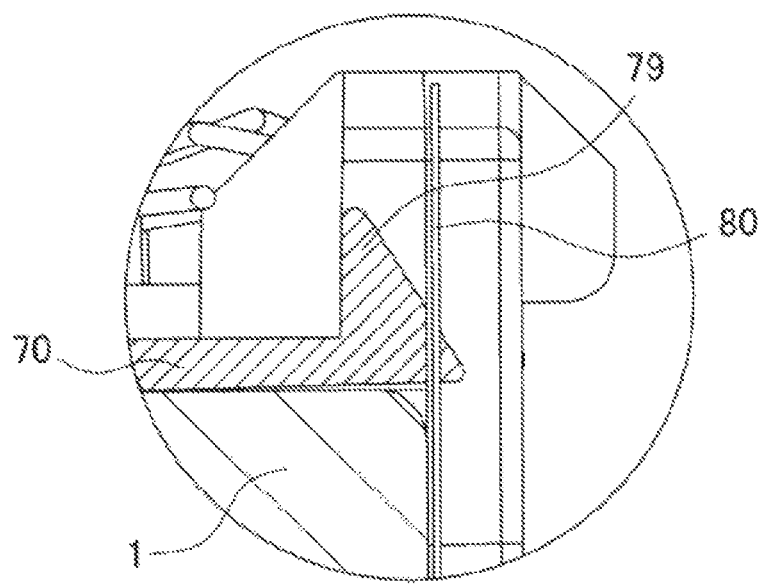
FIG. 19 is an enlarged cross-sectional view of portion XIX in FIG. 18 showing a guiding rib.
Figure 20:
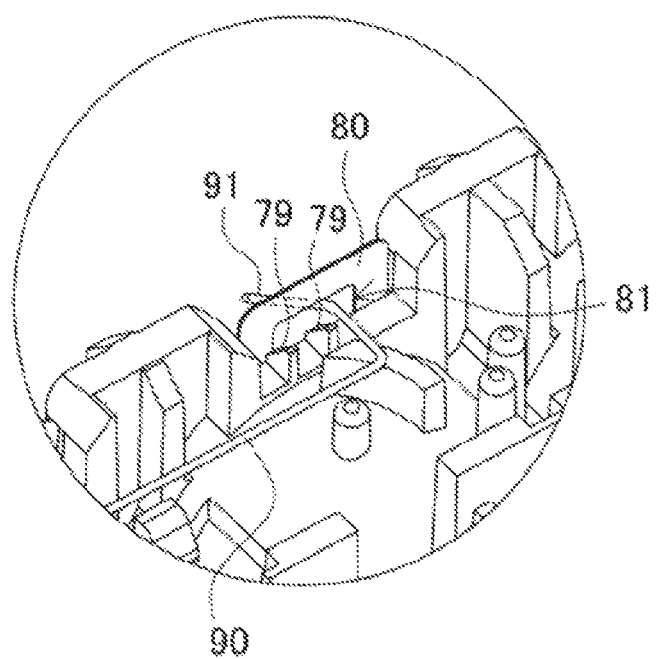
FIG. 20 is an enlarged perspective view showing a portion of the battery pack in FIG. 10 in which a lead pin has been inserted into a lead hole using the guiding rib.

In addition, a guiding rib 79 can be provided to guide the lead engaging end 91 into the lead opening 81 in the battery lead plate 80. The following is an explanation of this arrangement with respect to FIG. 17 through FIG. 20. FIG. 17 is an enlarged view of portion XVII of the battery holder in FIG. 10 in which a lead pin 90 has been inserted into a lead hole in the battery lead plate 80. FIG. 18 is a vertical cross-sectional view of the battery holder 70 from line XVIII-XVIII in FIG. 10. FIG. 19 is an enlarged cross-sectional view of portion XIX in FIG. 18 showing a guiding rib 79. FIG. 20 is an enlarged perspective view showing a portion of the battery pack in FIG. 10 in which a lead pin 90 has been inserted into the lead hole using the guiding rib 79. As shown in these drawings, the battery holder 70 is provided with a guiding rib 79 with an inclined surface in the battery lead plate 80 extending towards the lead opening 81. As shown in the cross-sectional view of FIG. 19, the guiding rib 79 has an inclined surface or downward slope which extends towards the outside, that is, towards the battery lead plate 80. Also, as shown in the top view of FIG. 17, there are two guiding tabs for each lead opening 81. In this way, as shown in the perspective view of FIG. 20 and the side view of FIG. 16, the lead pin 90 can be guided into the lead opening 81 using the guiding rib 79 so that the insertion operation is quick and reliable.

(Positioning of Pack Circuit Board 74 and Lead Pin 90)

Figure 21:
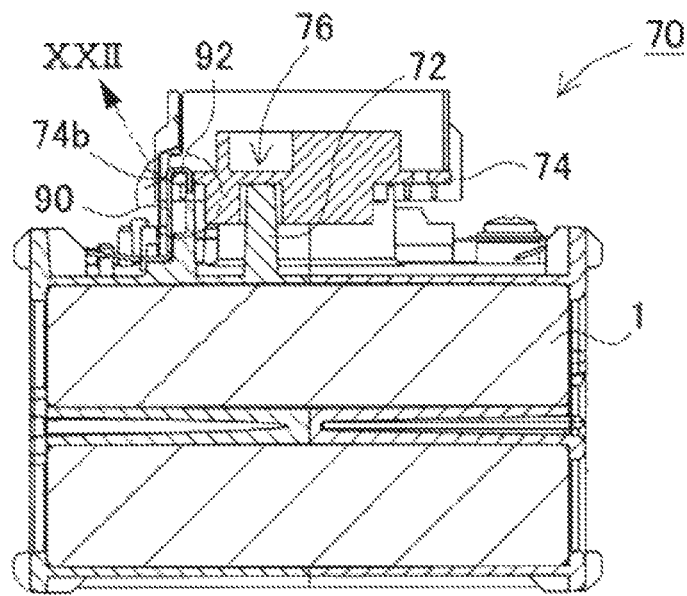
FIG. 21 is a vertical cross-sectional view of the battery holder from line XXI-XXI in FIG. 11.
Figure 22:
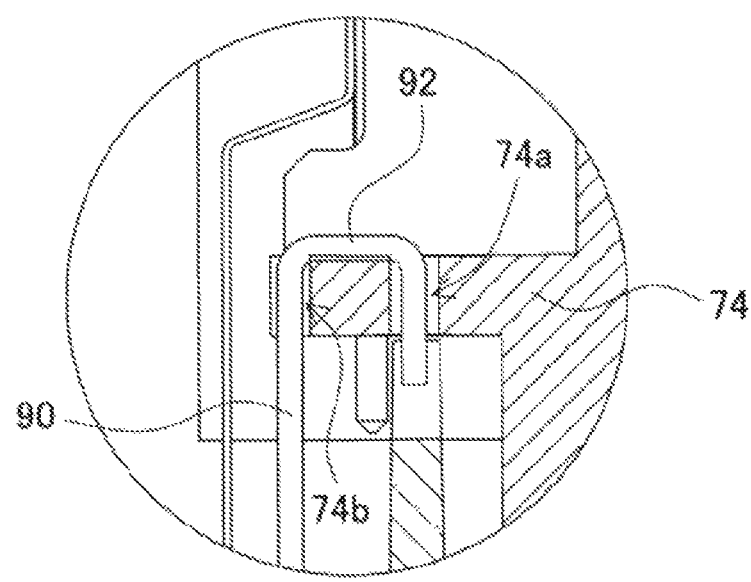
FIG. 22 is an enlarged cross-sectional view of portion XXII of the battery holder in FIG. 21 in which a lead pin has been secured in a pin securing hole.
Figure 23:
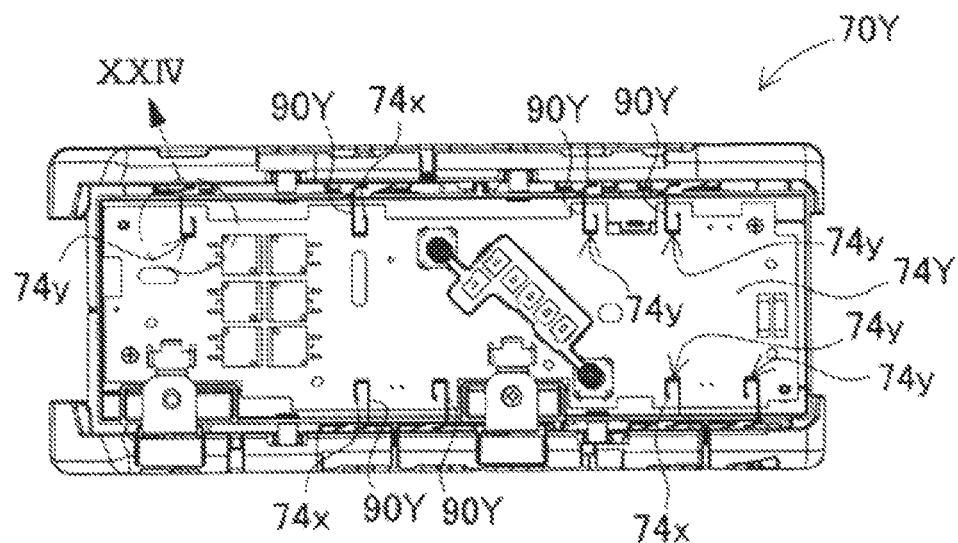
FIG. 23 is a top view showing a battery holder of the prior art.
Figure 24:
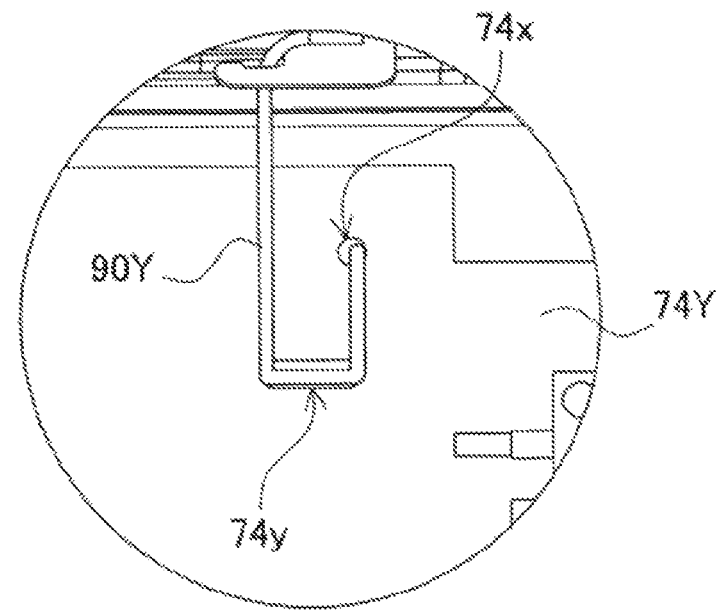
FIG. 24 is an enlarged view of portion XXIV of the battery holder in FIG. 23 in which a lead pin has been secured in a pin securing hole.
Figure 25:
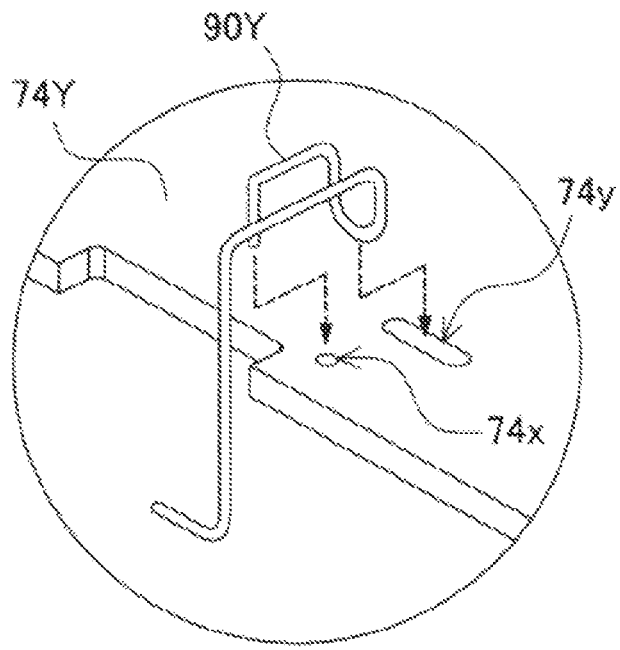
FIG. 25 is an exploded perspective view showing the lead pin in FIG. 24 being secured in a pin securing hole.
Figure 26:
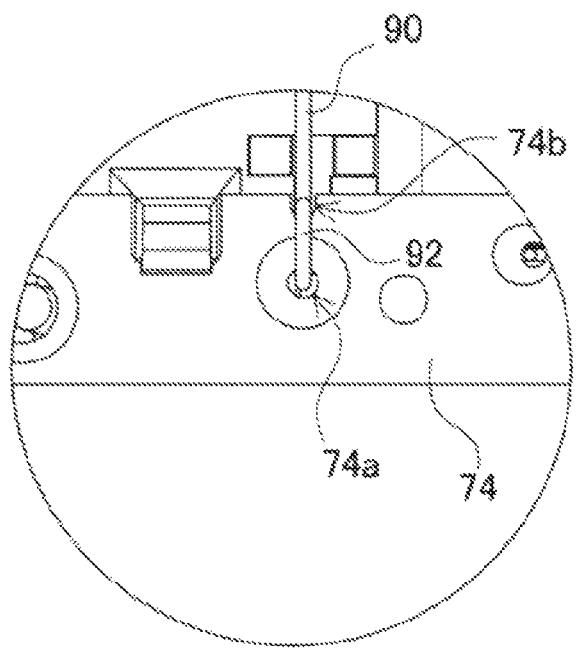
FIG. 26 is an enlarged view of portion XXVI of the battery holder in FIG. 10 in which a lead pin has been secured in a pin securing hole.
Figure 27:
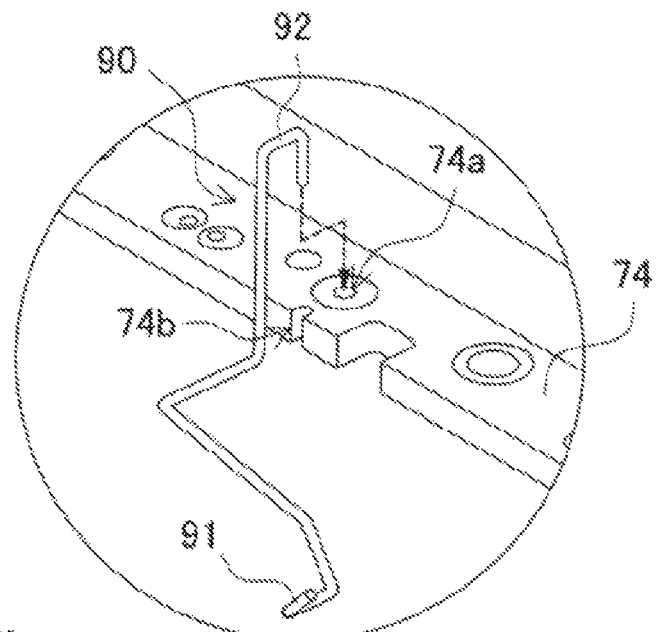
FIG. 27 is an exploded perspective view showing the lead pin in FIG. 26 being secured in a pin securing hole.
Figure 28:
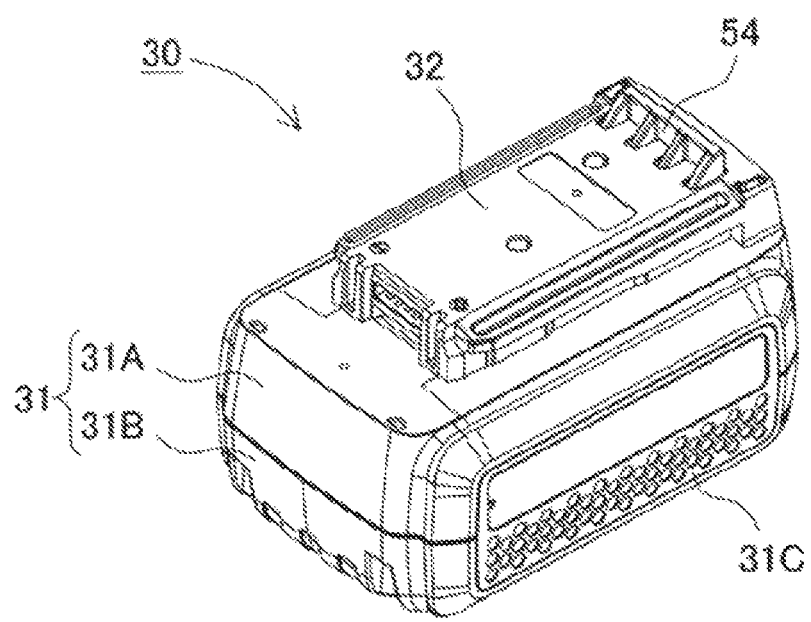
FIG. 28 is an external perspective view showing a battery pack of the prior art.
Figure 29:
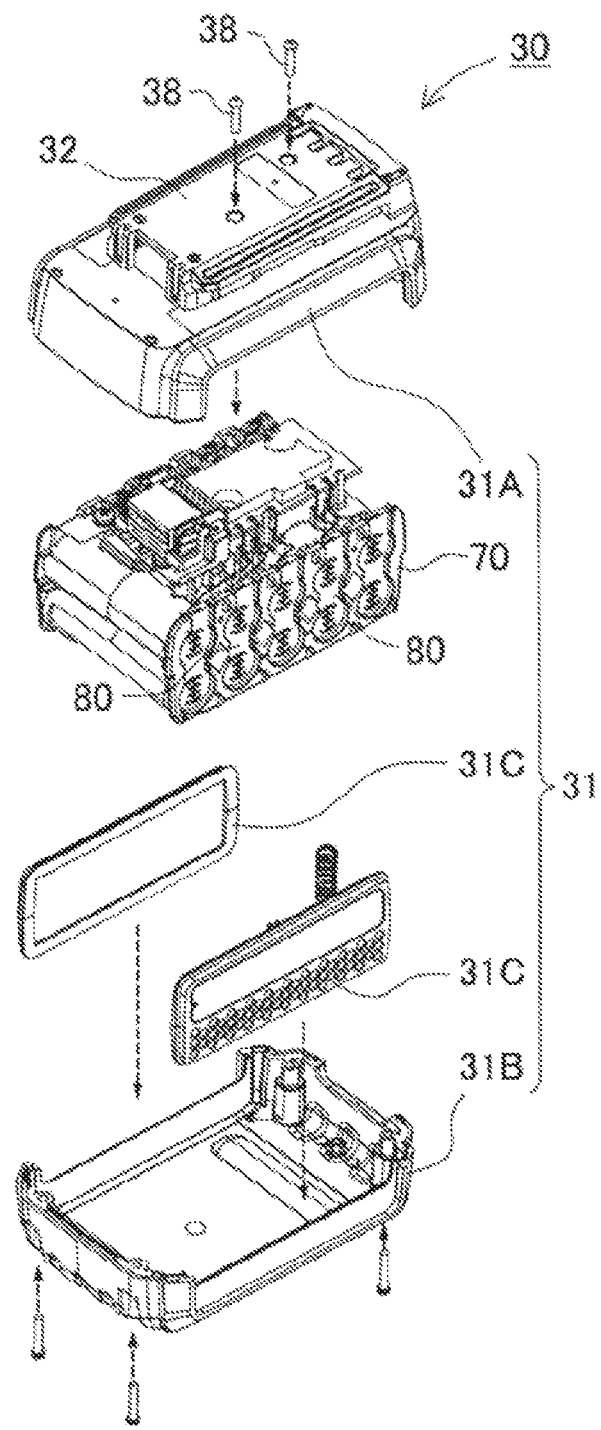
FIG. 29 is an exploded perspective view of the battery pack in FIG. 28.
Figure 30:
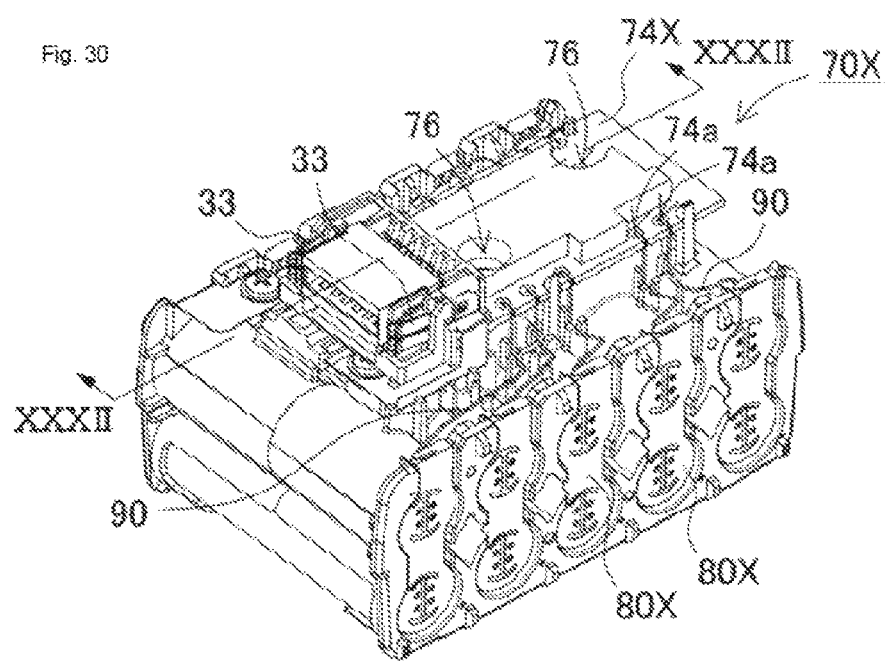
FIG. 30 is a perspective view of the battery holder in FIG. 29.
Figure 31:
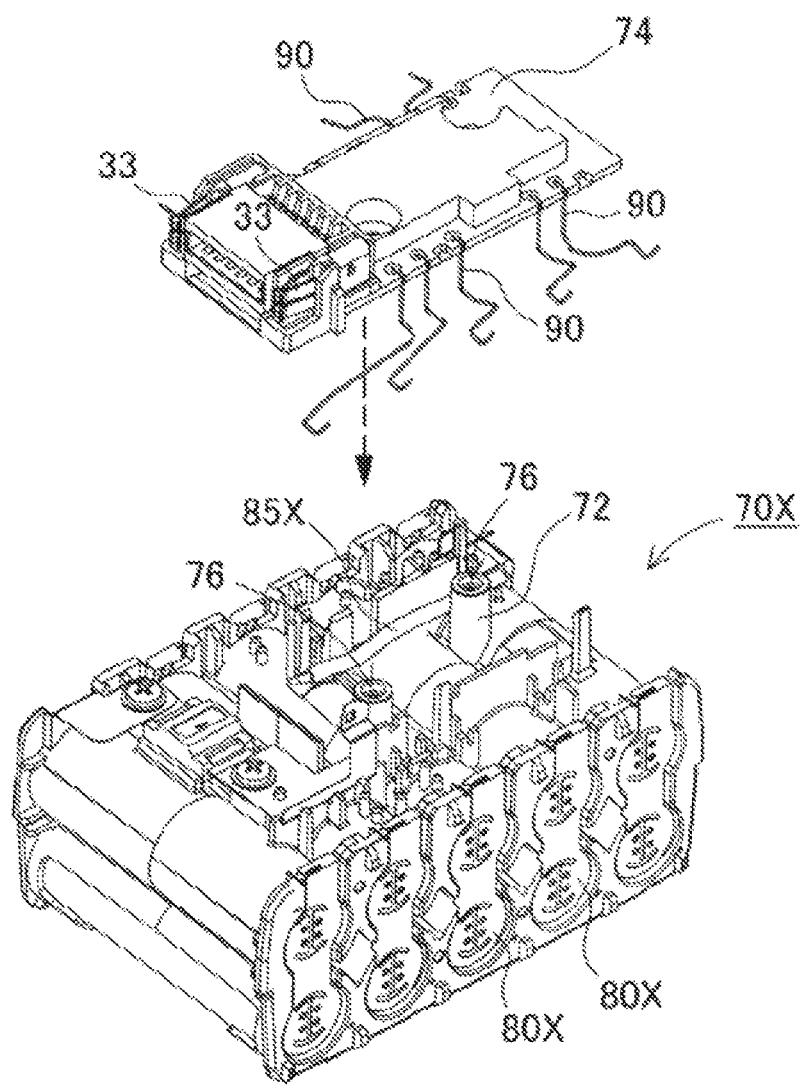
FIG. 31 is a perspective view of the battery holder in FIG. 30 with the pack circuit board removed.
Figure 32:
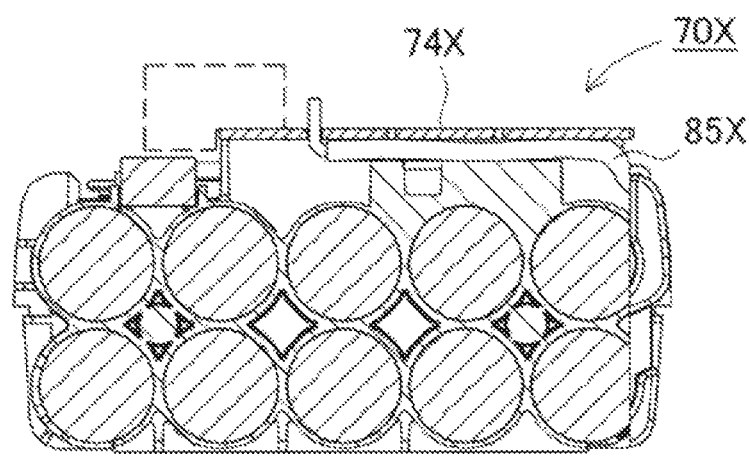
FIG. 32 is a vertical cross-sectional view of the battery holder from line XXXII-XXXII in FIG. 30.
Figure 33:
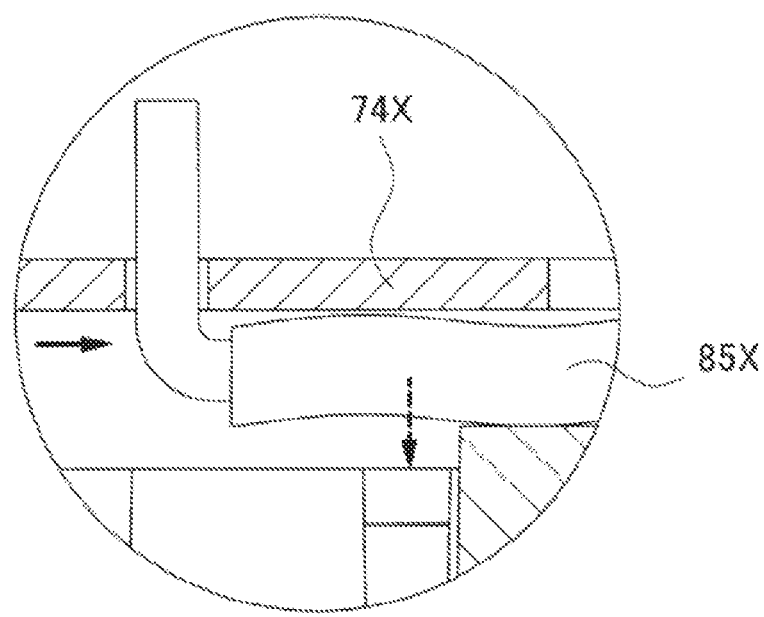
FIG. 33 is an enlarged cross-sectional view of FIG. 32.
Figure 34:
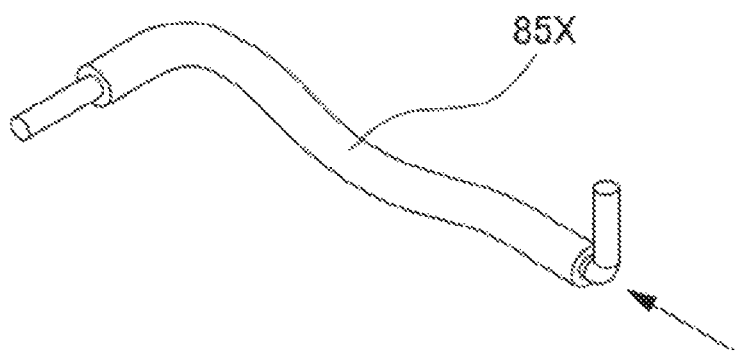
FIG. 34 is a perspective view of the power lead shown in FIG. 32.

The following is an explanation of the securing structure for the lead pin 90 and the pack circuit board 74 with reference to FIG. 21 through FIG. 27. FIG. 21 is a vertical cross-sectional view of the battery holder 70 from line XXI-XXI in FIG. 11. FIG. 22 is an enlarged cross-sectional view of portion XXII of the battery holder in FIG. 21 in which a lead pin 90 has been secured in a pin securing hole 74a. FIG. 23 is a top view showing a battery holder 70Y of the prior art. FIG. 24 is an enlarged view of portion XXIV of the battery holder in FIG. 23 in which a lead pin 90Y has been secured in a pin securing hole 74x. FIG. 25 is an exploded perspective view showing the lead pin 90Y in FIG. 24 being secured in a pin securing hole 74x. FIG. 26 is an enlarged view of portion XXVI of the battery holder in FIG. 10 in which a lead pin 90 has been secured in a pin securing hole 74a. FIG. 27 is an exploded perspective view showing the lead pin 90 in FIG. 26 being secured in a pin securing hole 74a.

In the prior art, a lead pin 90Y bent into a complicated shape as shown in FIG. 25 is secured as shown in FIG. 23 using a pin securing hole 74x and a pin securing slit 74y formed in the pack circuit board 74Y as shown in FIG. 24. In other words, only one end of the lead pin is secured to the pack circuit board. Because the positioning and direction are indeterminate, a pin securing slit 74y is opened in the pack circuit board 74Y, and a portion of the lead pin 90Y is bent into a shape that allows it to be inserted into the pin securing slit 74y. In this configuration, a pin securing slit 74y has to be opening in the pack circuit board 74Y. Also, a portion of the lead pin 90Y has to be bent in accordance with the pin securing slit 74y. This processing is time-consuming.

The example of the present invention uses the pack circuit board 74 and lead pin 90 shown in FIG. 26 and FIG. 27 to position and secure the lead pin 90 in a predetermined position using a simpler structure. First, as shown in FIG. 26, the pack circuit board 74 has a pin engaging portion 74b formed on the edge of the pack circuit board 74 near the pin securing hole 74a. As shown in FIG. 27, the end of the lead pin 90 opposite the end with the lead engaging end 91 is bent so as to be substantially parallel to the edge, and then bent into a C-shape (U-shape) to form a pin securing end 92. The width of the bent portion of the pin securing end 92 is aligned with the width of the pin securing hole 74a and the pin engaging portion 74b of the pack circuit board 74. Thus, as shown in FIG. 22, the lead pin 90 can be bent so that the pin securing end 92 is inserted and secured in the pin securing hole 74a, and the C-shaped bent portion engages the pin engaging portion 74b. In other words, the lead pin 90 can be positioned so that the pin securing end 92 bridges the pin securing hole 74a and the pin engaging portion 74b, thereby making the lead pin 90 easy to insert into the pack circuit board 74. The processing of the pack circuit board is much simpler because a pin securing slit does not have to be opened in the pack circuit board. A pin engaging portion 74b is simply formed in a portion of the edge. Manufacturing costs can also be reduced because the bent portion of the lead pin 90 has a simpler configuration.

The battery pack of the present invention can be used as a battery pack for operating battery-operated machinery such as a power tool, or as a battery pack for operating mobile equipment and devices such as a motor-assisted bicycle, an electric bicycle, or a mobile phone.

What is claimed is:

1. A battery pack comprising:
  at least one rechargeable secondary battery;
  a battery holder for housing the secondary battery in a predetermined position;
  a pack circuit board having a mounted electronic circuit for monitoring the secondary battery; and
  an electrical connection wire for electrically wiring the pack circuit board, wherein the electrical connection wire includes a bent portion at a middle of the electrical connection wire in a longitudinal direction thereof, the bent portion having a U-shape, and wherein the battery holder forms a plurality of holding ribs on an upper surface of the battery holder and under the pack circuit board to hold the bent portion at upper surfaces of the holding ribs.

2. A battery pack according to claim 1, wherein the electrical connection wire is an output line of the secondary battery.

3. A battery pack according to claim 1,
wherein the pack circuit board forms a connection hole,
and wherein one end of the electrical connection wire is bent and inserted into the connection hole.

4. A battery pack according to claim 1,
wherein the battery holder forms a circuit board securing portion at the upper surface of the battery holder to secure the pack circuit board.

5. A battery pack according to claim 1,
wherein the battery holder has bosses for supporting the pack circuit board.

\* \* \* \* \*